Oct. 13, 1970 C. HAZLEWOOD 3,533,537
MACHINE FOR MAKING FROZEN CARBONATED BEVERAGES
Filed Aug. 13, 1968
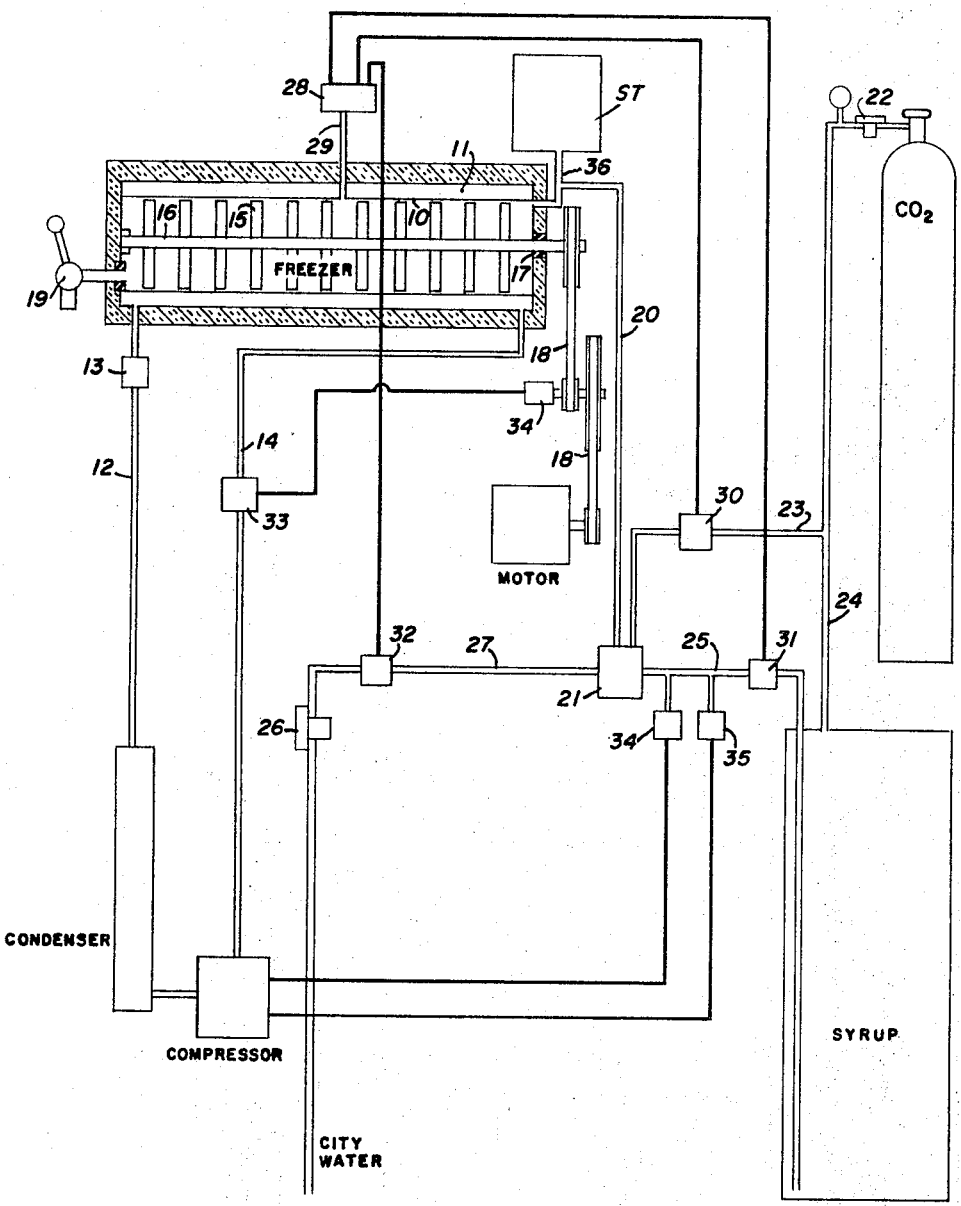
CALVIN HAZLEWOOD
INVENTOR
BY
ATTORNEY

United States Patent Office 3,533,537
Patented Oct. 13, 1970

3,533,537
MACHINE FOR MAKING FROZEN CARBONATED BEVERAGES
Calvin Hazlewood, 3720 Wyndale Court, Fort Worth, Tex. 76109
Filed Aug. 13, 1968, Ser. No. 752,379
Int. Cl. B67d 5/62
U.S. Cl. 222—146
4 Claims

ABSTRACT OF THE DISCLOSURE

A machine for making frozen carbonated beverages and including a safety feature consisting of a surge tank attached to the freezing unit into which the liquid ingredients can back up against a cushion of gas before pressure in the freezer builds up sufficiently to cause damage to the freezer components.

---

This invention relates to machines for making and dispensing frozen carbonated beverages and is directed to a surge tank connected to the freezing unit of the machine whereby, in the case of failure of any of a number of pressure controls, the liquid ingredients being fed into the freezing unit can back up into the surge tank against a gas cushion to prevent the pressure in the unit from reaching a point where components of the unit are damaged.

In the machine under consideration, a mixture of prepared syrup, water and carbon dioxide is fed under pressure into a cylindrical chamber surrounded by a refrigerant. A dasher keeps the mixture stirred and the pressure is sufficient to allow the mixture to be cooled below its freezing point at atmospheric pressure. When the mixture is withdrawn through a dispensing valve at the opposite end of the cylinder through which it enters, the frozen mixture is released in the form of a slush or sherbet type product which is eaten from a cone or a cup.

The popularity of this type of product has resulted in the manufacture and distribution of a large number of machines of the above described type, but the operation of these machines has been attended by various difficulties inherent in the cycle used to produce the product, one of the major troubles being caused by the delicate balance between temperature and pressure required to achieve optimum results. Any malfunction of one of several control elements may cause the product in the freezing cylinder to harden prematurely, slowing down or stopping the dasher, thus accelerating the hardening and allowing excessive pressure to build up within the cylinder as its contents solidifies. The volume of the solidly frozen product is, of course, greater than when it is in liquid form.

The result of a freeze-up, as above referred to, is usually that the seal around the dasher shaft is blown out, or some part of the dispensing valve is broken or distorted, making it useless. Besides the cost of replacement there is time lost in melting the solidified product in the cylinder.

The accompanying drawing is a diagrammatic layout of the components used in typical frozen carbonated beverage machines which the hereinafter described invention has been made a part of.

The freezer consists of an inner cylindrical shell 10 surrounded by an insulated annulus 11 through which is circulated a refrigerant, such as Freon, brought from a condenser through a line 12 and expansion valve 13, and thence back to the compressor through a return line 14.

A dasher 15 on a shaft 16 operates within the shell 10 and the shaft 16 extends through a seal 17 where it is connected by a reducing belt drive 18 to a motor. A dispensing valve 19 leads from one end of the shell 10 and the unfrozen product enters at the other end through a line 20 leading from a mixing valve 21. Carbon dioxide is fed by a pressure regulator 22 through line 23 to the mixing valve 21 and also through a branch line 24 to the syrup tank from whence it forces the syrup to flow through a line 25 to the mixing valve 21. Water is also fed by a pressure regulator 26 through a line 27 to the mixing valve 21.

A pressure sensitive electronic control unit 28 is attached by a tube 29 to the inner shell 10 of the freezer. The control unit 28 regulates the flow of ingredients to the freezer by means of a valve 30 on the $CO_2$ line 23, a valve 31 on the syrup line 25 and a valve 32 on the water line 27. A solenoid valve 33 on the refrigerant return line 14 is set to close when excessive torque on the belt drive 18 indicates that the mixture in the freezer is hardening prematurely. This is accomplished by a torque operated switch 34 and immediately raises the temperature in the annulus 11.

One likely source of excessive pressure in the system is from malfunction of the $CO_2$ pressure regulator 22 since the supply tank may contain 1000 p.s.i. or more. For this reason a pressure switch 34 is attached to the syrup line 25, which is set to stop the compressor if the pressure on the line goes, for example, above 25 or 30 lb. per sq. inch. An additional pressure switch 35 is set to shut down the compressor if the pressure on the line 25 goes above 45, for example, or 50 p.s.i. in case the pressure switch 34 fails to operate.

Another possible source of failure in the system is excessive preliminary hardening of the mixture in the freezer when no product is drawn off for a long period and the torque switch 34 and/or the solenoid valve 33 is improperly adjusted or fails to respond immediately. Once the solidification process in the freezer starts it progresses very rapidly and it is then that damaging pressure can be built up before emergency measures can be taken.

With the addition of a surge tank ST attached to the product feed line 20 by a short duct 36 close to where it enters the freezer shell 10, air or $CO_2$ gas entrapped in the tank ST will form a cushion against which the back pressure caused by a freeze-up can escape. Although the pressure from a completely confined freeze-up is sufficient to cause serious damage, the actual increase in volume is limited and is easily handled by the available space in the surge tank ST. The small pressure increase generated during a freeze-up, if the surge tank ST is attached, can be easily accommodated by the system until such time as the product in the freezer can be allowed to thaw and the cycle restarted.

What is claimed is:
1. In a frozen carbonated drink dispensing machine including a freezing unit having an inner shell with a powered dasher therein, and having a dispensing valve and a pressurized liquid product supply line attached thereto, a closed surge tank normally containing a gas and connected to said supply line adjacent its entrance to said inner shell unit by a tube leading to the bottom of said surge tank.
2. In a frozen carbonated drink dispensing machine as defined in claim 1 and wherein said surge tank is located above the liquid level of said freezing unit.
3. In a frozen carbonated drink dispensing machine as defined in claim 1 and wherein a mixing valve is connected with both the freezing unit and the surge tank.

4. In a frozen carbonated drink dispenser as defined in claim 1 and wherein said liquid product supply line includes a mixing valve, a water supply line connected with said mixing valve and means regulating the volume of water passing through said water supply line.

References Cited

UNITED STATES PATENTS

| | | | |
|---|---|---|---|
| 2,536,319 | 2/1951 | Slack | 62—136 X |
| 3,044,878 | 7/1962 | Knedlik | 62—306 X |
| 3,398,550 | 8/1968 | Lents | 62—306 X |

SAMUEL F. COLEMAN, Primary Examiner

H. S. LANE, Assistant Examiner

U.S. Cl. X.R.

62—69